UNITED STATES PATENT OFFICE.

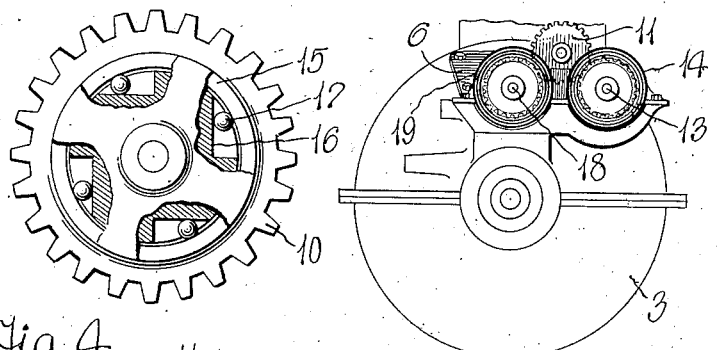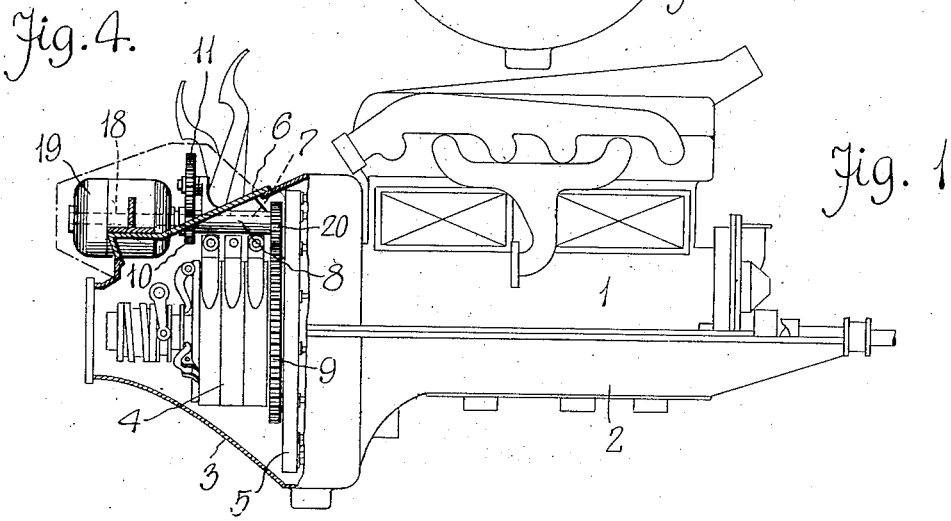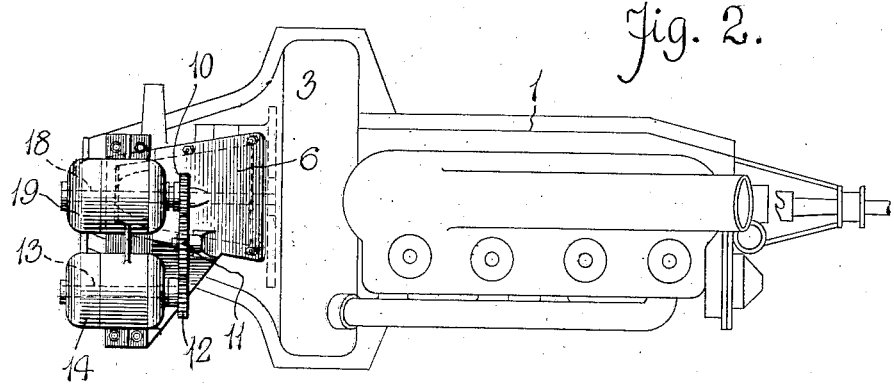

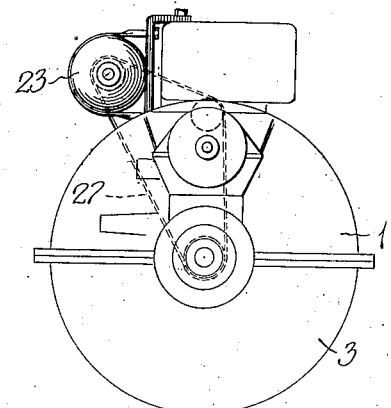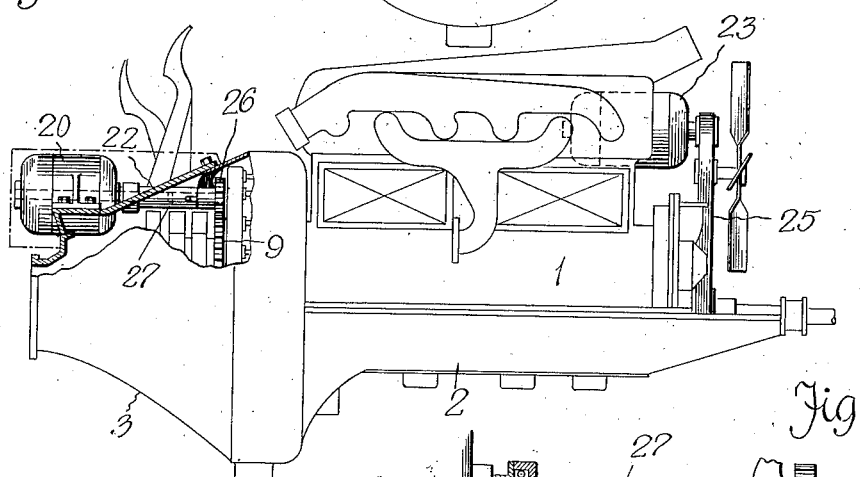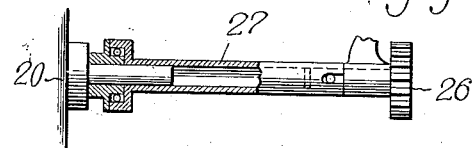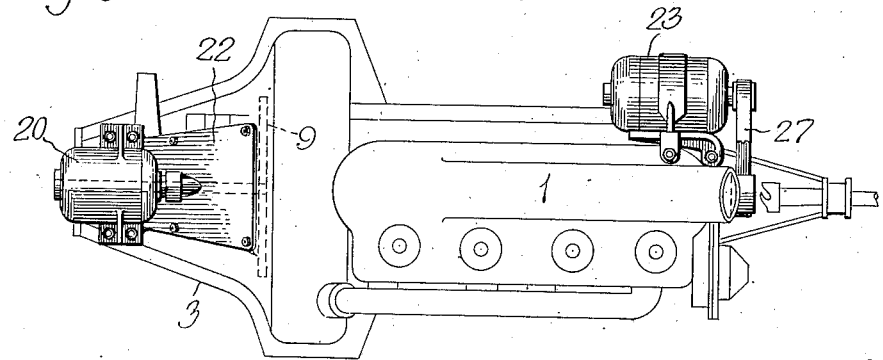

GEORGE K. PARSONS, OF DETROIT, MICHIGAN.

AUTOMOBILE-STARTER.

1,297,003.   Specification of Letters Patent.   Patented Mar. 11, 1919.

Application filed February 21, 1916. Serial No. 79,707.

*To all whom it may concern:*

Be it known that I, GEORGE K. PARSONS, a citizen of the United States of America, residing at Detroit, in the county of Wayne and State of Michigan, have invented certain new and useful Improvements in Automobile-Starters, of which the following is a specification, reference being had therein to the accompanying drawings.

In the designing of electrically operated self starting devices for automobiles, power plants or the like it is desirable that they be so placed as to be readily detachable from the plant so as to give complete access thereto without the necessity of disturbing the relations of the parts of the starting mechanism itself. It is further advantageous to have the power that starts the motor applied to the power end of the motor shaft, that is, adjacent its connection with the power transmitting means so that the support which is given that part of the shaft is utilized to rigidly maintain the parts in position and the starter is not compelled to work through the entire length of the crank shaft of the motor. It is further advantageous to have the connection with the motor as direct as possible.

This invention relates to a self starter for the power plant of an automobile or the like and to a disposition thereof whereby the device as a whole is readily removable as a unit without the necessity of readjustment of parts when the device is replaced and without the need of special tools to line up or adjust the parts which form the transmitting mechanism between the self starter and the motor itself. Another feature of the device is the accessibility thereof and its connection to the motor shaft at the power transmitting end.

The invention consists in the matters hereinafter set forth, and more particularly pointed out in the appended claims.

In the drawings,

Figure 1 is a view in elevation, partially broken away and in longitudinal section, of a power plant for an automobile of a well known standard type equipped with a self starter that embodies the invention;

Fig. 2 is a plan view thereof;

Fig. 3 is an end view in detail showing the disposition of the driving members;

Fig. 4 is a view in detail of one form of overrunning clutch that may be used;

Fig. 5 is a view in elevation of a modification of the device;

Fig. 6 is a plan view of the modification;

Fig. 7 is a view in end elevation of the modification; and

Fig. 8 is a view of a modification in the driving mechanism.

As herein indicated, a motor 1 with crank casing 2 and transmission casing 3 forms a power unit of conventional or standard type adapted to be mounted in a vehicle such as an automobile or boat. The casing 3 has a cover on its upper side that is removable for inspection and adjustment of transmission mechanism which is indicated diagrammatically at 4, the casing likewise housing the fly wheel 5 of the motor.

A base plate 6 replaces the ordinary cover plate of the casing and seals the opening referred to when bolted in position, its alinement being secured by ordinary mechanical means such as dowels or the like. A main driving shaft 7 is journaled in a suitable bearing 8 of the base plate so that it is parallel with the crank shaft of the power plant. A driving pinion 20 on the end thereof meshes with a fly wheel gear 9 of appropriate size and design to be secured directly to the fly wheel 5 of the motor or to the crank shaft at this point, dependent upon structural conditions. A gear 10 at the other end of the shaft 7 is connected through an intermediate wheel 11 and generator gear 12 with the shaft 13 of a generator 14 of suitable type that is secured in proper manner upon the base plate 6. The gear 10 at the other end of the shaft 7, is coupled also to a clutch ring 15 which coöperates with a companion clutch plate 16 and grab balls 17 to rotate the shaft 18 of a motor 19. The parts of the clutch are so disposed that the ring 15 drives in one direction only while the grab members 17 permit the overrunning of the ring 15 as the engine rotates above the motor shaft speed.

It is to be understood that the usual connections are made with the storage battery which is charged by the generator constantly when the latter is running, up to the point where the generator and counter E. M. F. of the battery balance.

As in many constructions of self starters the generator forms no part of the starter *per se*, the latter may be omitted from the base plate, and in such instance, may be mounted at any convenient point and belt driven or otherwise rotated by the engine from either end of the shaft, as the torque is slight. Such construction is seen in Figs. 5, 6 and 7 in which the motor 20 is mounted on the base or cover plate 22 as before, but the generator 23 may be mounted anywhere and driven as by the fan belt 25 or the like.

The clutch shaft may be disposed as in Fig. 8 the drum pinion 26 being permanently in mesh with the gear 9 and the shaft 27 being separable as indicated.

As a result of this construction a simple starting device is obtained which effectively spins the motor and continues to drive it until the crank shaft speed causes the overrunning of the clutch and release of the motor. The starter constitutes a bodily removable unit which replaces the cover plate of the casing and which because of the disposition of the driving pinion and the fly wheel gear, is as quickly replaced without the necessity of tools, the base returning to position so that the driving pinion and motor gear mesh in proper relation. It is to be understood that a dust cover such as indicated in dotted lines may be used to shield the starter unit. Because of the disposition of the starter on the crank case which forms a substantially integral part of the power plant as a whole it is rigidly supported in true relation to the motor and any shocks which are transmitted to the chassis of an automobile or to the hull of a boat do not affect the relation of the motor and starter. Furthermore the starter applies the power directly to the crank shaft of the motor at the fly wheel end thereof so that advantage is taken of the crank shaft bearings at that point which are designed appropriately. Thus the starter does not turn the motor through the entire length of the crank shaft and consequently power is transmitted more efficiently.

Obviously, changes in the details of construction may be made without departing from the spirit of the invention and I do not care to limit myself to any particular form or arrangement of parts.

What I claim is:—

1. The combination with a power plant for a vehicle, including an explosive engine crank case and gear case forming a unitary structure and having a view opening in the gear casing, of a base plate adapted to be removably secured over the opening, a starting motor mounted on the base plate, a transmission mechanism connected to the motor, including a gear and a gear on the explosive engine with which the first gear is held in operative meshing relation when the base plate is secured on the opening, the base plate having means for holding the meshing gears in alinement.

2. The combination with an explosive engine, a casing extension thereon having a view opening and a gear mounted directly on the engine and adapted to drive the latter when rotated, of a base plate adapted to be secured over the view opening, a motor on the base plate, and transmission mechanism mounted on the base plate and driven by the motor, including a gear adapted to be brought into mesh and held in operative meshing relation with the engine gear when the base plate is mounted in position.

In testimony whereof I affix my signature in presence of two witnesses.

GEORGE K. PARSONS.

Witnesses:
 KARL H. BUTLER,
 ANNA M. DORR.